Figure 1:
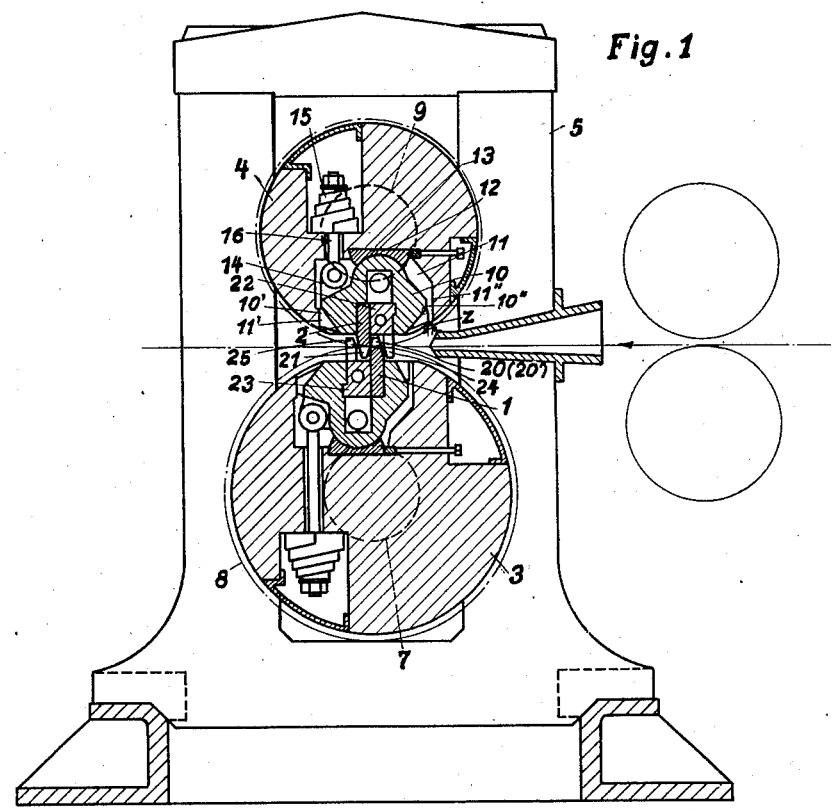

Feb. 27, 1934.  E. MÜLLER  1,948,796
ROTATING SHEARS WITH MOVABLE NONOPERATED KNIVES FOR
CUTTING RUNNING MATERIAL OF ANY REQUIRED LENGTH
Filed Oct. 12, 1931

Inventor:
Erich Müller

By Knight Bros.
attys.

UNITED STATES PATENT OFFICE 1,948,796

ROTATING SHEARS WITH MOVABLE NON-OPERATED KNIVES FOR CUTTING RUNNING MATERIAL OF ANY REQUIRED LENGTH

Erich Müller, Magdeburg-Sudenburg, Germany

Application October 12, 1931, Serial No. 568,456
In Germany October 13, 1930

6 Claims. (164—68)

This invention relates to shears for cutting rolled material immediately after the last pass. The invention refers especially to such shears of which the cutting knives are placed on rotating bodies (rotators) of the same circumferential speed and are brought to shearing relation after the rotators have made one or several rotations. Up to now, the knives have been rigidly placed in the rotators, wherefore the knives turn with the same circumferential speed as the rotators. Only a certain length can generally be cut with one pair of rotators. Although the length of cut may be regulated within certain limits, this leads, however, to difficulties in service. When using such shears, it is a general practice to have the rotators, which bear the knives, turn at the same circumferential speed which corresponds with the feeding speed of the material to be cut, in order to obtain a regular cutting of the knives. When altering the length of the bars to be cut, the circumferential speed of the rotators has to be increased or to be diminished, which is effected by regulating the number of revolutions of the motor or by inserting other rotators of a larger or smaller diameter. This latter mode is naturally costly. On the other hand alteration of the circumferential speed of the rotators has the disadvantage that the circumferential speed does not correspond with the feeding speed of the material to be rolled. The knives will then effect a drawing action upon the rolled material during the cutting, furthermore an unfavorable working of the knives sets in, leading to their quick wear or to damage of the driving parts.

The invention provides shears in which the knives are able to adapt themselves within the zone of cutting to the feeding speed of the material to be rolled, if the number of revolutions of the rotators does not correspond with said feeding speed.

This is attained by the invention by mounting the knife bodies yieldably so that they can adapt themselves, in case of a difference between the circumferential speed of the rotators and the feeding speed of the material. In this way the injurious straining of knives and knife-bearers, or of driven parts occurring with rigid knives is avoided. This is an important advantage, since the life of such shears is thereby prolonged and with the use of a single pair of rotators for various lengths to be cut, a clean cut of the rolling material is attained.

The drawing shows one form of the invention by way of example.

Figure 2:
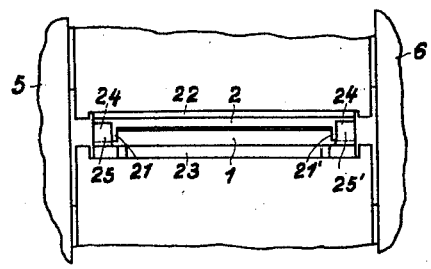

Fig. 1 shows a vertical section of the shears transverse to the rotators bearing the knives, and Fig. 2 is a fragamentaray elevation of the knives and rotators.

Two knives, 1, 2, are mounted upon rotators 3, 4 rotatably supported in housings 5, 6 by means of trunnions 7, 9. The rotator 3 is driven by a motor (not shown) and its motion is transmitted through gears 8 and 8' to the trunnion 9 of rotator 4. In the example illustrated, the two rotators 3, 4 have different diameters and are driven at such relative speeds that the knives 1 and 2 come into shearing relation each time the rotator 3 makes five revolutions. In this case the length of the piece of rolled material cut off is always six times the circumference of the rotator 3.

The upper knife 2 is placed in the knife-carrier 10. This latter, arranged in a recess 11 of the rotator 3, has at its top a cylindrical bearing surface, resting in the trough 13. The knife-carrier 10 is provided laterally with a projection 14, which is connected to a tie rod 16 constantly under the influence of a compression spring 15. Normally the knife carrier 10 is in the position in which its side edge or surface 10' is held against the wall 11' of the recess 11 by the action of spring 15. There is then play between the opposite wall 10'' of the knife carrier 10 and the corresponding wall 11'' of the recess 11. The knife 1 is mounted in roller 3 in the same way that the knife 2 is mounted in roller 4. When the circumferential speed of the rotator 3, 4 corresponds with the speed of the rolled material, both the knives 1, 2 will cut at the position shown without change of the position of the knife-carrier in the respective rotator. The knives 1, 2 are then kept in their position by means of the pressure springs. If, however, the circumferential speed of the rotators does not correspond with the rolling speed, that is if the feeding speed is slower, the knives will adapt themselves to the feeding speed in cutting of the rolled material, by turning the knife-carrier around its axis in the direction opposite to the rotation of the rotator. The distance between the wall 10'' of the knife-carrier 10 and the wall 11'' of the recess 11 is so chosen that great differences in the circumferential speed of the rotators and the rolling speed can be compensated, so that also in such a case a perfect cutting of the material is attained, without injurious effects upon the knives or their carriers. After the cutting, the knives 1, 2 return to their position of rest under the influence of the pressure springs. In order to give both knives 1, 2 the necessary guiding during the cutting, the top knife 2 and the bottom knife 1 are each provided at their ends with a projection in the form of a tooth 20, 20' and 21, 21' respectively. Besides these there are mounted in the knife carriers 10 blocks 22 and 23 respectively, which are likewise provided at their ends with tooth-like projections 24, 24' and 25, 25' respectively. These projections all cooperate to give the knives the required guidance during the cut, whereby proper shearing of even very thin rolled material, e. g. thin bands, is assured. The guidance of the knives is in this way made completely independent of the condition of the driving gears and thereby the danger of clashing of the knives is prevented.

Instead of mounting the knife carriers yieldably in the rotators, the rotators can be so mounted, or the drive so constructed, that the knives can adapted themselves to differences in speed between the rotators and the feed of the rolled material.

Having described my invention, what I claim is:

1. Rotating shears for cutting rolled materials, comprising a pair of knives, means whereby said knives are mounted to revolve about two parallel axes in such a way that the knives come into shearing relation as they revolve, driving means for causing said knives to revolve at such relative speed that they come into shearing relation after a predetermined number of revolutions, said mounting means including yieldable connections permitting both of said knives to yield together in the same direction parallel to the feed of the rolled materials, to adapt their speed to that of the rolled materials.

2. Rotating shears for cutting rolled materials, comprising a pair of rotators mounted to revolve on parallel axes, knives mounted at the peripheries of said rotators to rock about axes parallel to the axes of said rotators and adapted to come into shearing relation as said rotators revolve, yieldable means normally holding said knives in a definite angular position with respect to said rotators and adapted to permit said knives to yield in the same direction parallel to the feed of the rolled materials, and means for driving said rotators at such relative speed that said knives come into shearing relation after a predetermined number of revolutions.

3. Rotating shears for cutting rolled materials, comprising a pair of rotators mounted to revolve on parallel axes, said rotators having outwardly directed cylindrical bearing surfaces parallel to their axes, knife carriers rockably mounted on said rotators and having cylindrical surfaces resting in said bearing surfaces, said bearing surfaces being substantially co-extensive with said knife carriers, knives on said knife carriers adapted to come into shearing relation as said rotators revolve, yieldable means normally holding said knife carriers in a certain position with respect to said rotators and adapted to permit said knife carriers to yield together in the same direction parallel to the feed of the rolled materials, and means for driving said rotators at such relative speed that said knives come into shearing relation after a predetermined number of revolutions.

4. Rotating shears as described in claim 1 in combination with means adjacent to said knives and cooperating therewith for guiding said knives into shearing relation.

5. Rotating shears as described in claim 1, in combination with projecting fingers on said knives for guiding them into shearing relation.

6. Rotating shears as described in claim 3, in combination with projecting fingers on said knife carriers for guiding said knives into shearing relation.

ERICH MÜLLER.